United States Patent Office 2,838,560
Patented June 10, 1958

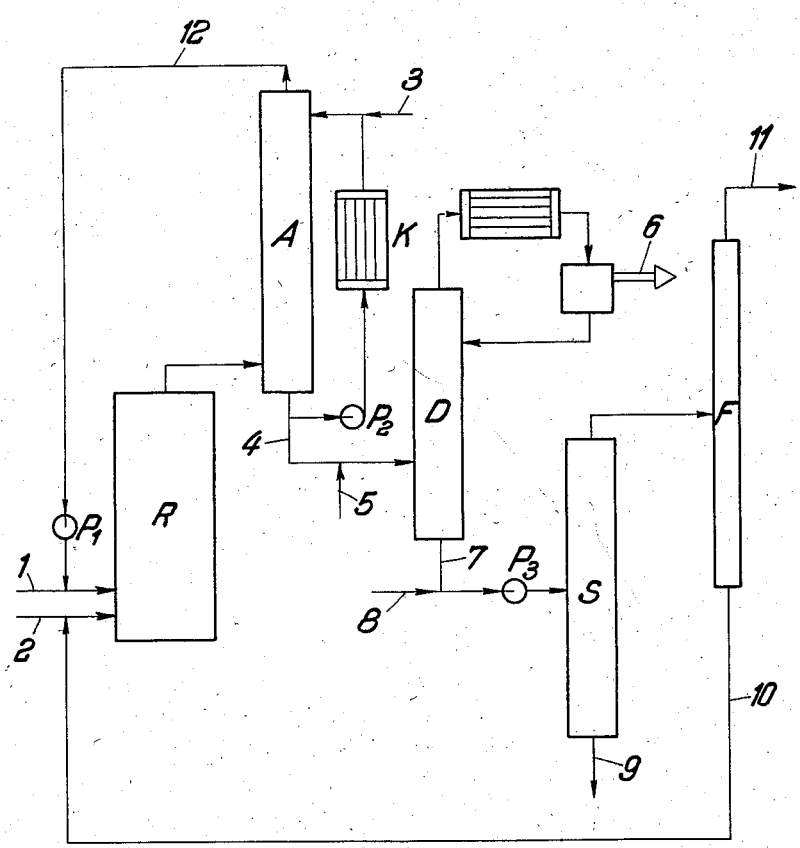

2,838,560

MANUFACTURE OF ACRYLONITRILE

Emil Lüscher, Basel, and Hans Peter Sieber, Visp, Switzerland, assignors to Lonza Electric and Chemical Works Ltd., Basel, Switzerland Application May 29, 1956, Serial No. 588,081

Claims priority, application Switzerland June 2, 1955

8 Claims. (Cl. 260—465.3)

The invention relates to the manufacture of acrylonitrile by addition of hydrogen cyanide to acetylene in an aqueous medium in the presence of catalysts.

The standard procedure consists in heating a solution of the catalyst in a reaction vessel to about 70 to 90° C., in introducing continuously hydrogen cyanide into the vessel and in forcing simultaneously an excess of acetylene gas through the catalyst solution. The formed acrylonitrile is separated, for instance by washing, from the excess of acetylene, and said acetylene is recycled into the reaction vessel.

Suitable catalysts are compounds which are capable of polymerizing acetylene to vinyl compounds. In the commercial manufacture, essentially such catalyst mixtures are employed which contain cuprous chloride and additions, such as NaCl, KCl, or $NH_4Cl$, in hydrochloric acid solution.

A drawback of the known process is the formation of considerable amounts of undesirable by-products, such as acetaldehyde, monovinyl acetylene, divinyl acetylene, higher acetylene polymers and addition products of hydrogen cyanide and hydrogen chloride to vinyl compounds; said by-products can be removed, for instance by repeated fractionated distillation, but such purification involves a loss of acrylonitrile. A particularly obnoxious impurity is divinyl acetylene which cannot be completely removed by simple operations. However, if the obtained acrylonitrile still contains even small amounts of divinyl acetylene, it is unsuitable for various applications, for instance for polymerization or for the spinning to filaments.

In addition, the above recited by-products, particularly acetaldehyde, make it difficult to recover acrylonitrile from the recycled acetylene, and solutions are obtained, which contain only a low concentration, for instance only 1 to 2 percent, of acrylonitrile, which is uneconomic for processing to a refined end product.

Attempts have been made to reduce the formation of monovinyl acetylene and divinyl acetylene by increasing the concentration of the hydrogen cyanide. This procedure is not a technical solution of the problem because the unreacted hydrogen cyanide is lost or can be recovered only by expensive methods.

It is, therefore, a principal object of the invention to provide in the catalytic production of acrylonitrile from acetylene and hydrogen cyanide a method of reducing the formation of harmful by-products, particularly vinyl acetylenes.

Other objects and advantages will be apparent from a consideration of the specification and claims.

According to the invention, the reaction of acetylene and hydrogen cyanide in the presence of aqueous cuprous chloride containing catalysts is carried out in such a way that the gases leaving the reaction zone are passed through an absorption zone in which acetaldehyde formed as a by-product during the reaction is reacted with unconsumed hydrogen cyanide to lactic nitrile (acetaldehyde cyanohydrin), which latter is, together with the bulk of the produced acrylonitrile, continuously removed from the circulating gas.

The novel process makes it possible to increase the hydrogen cyanide concentration in the cuprous chloride catalyst and to prevent in this way the obnoxious formation of mono and divinyl acetylene. The unconsumed hydrogen cyanide carried off with the circulating gas is continuously returned to the catalyst with said gas. Without the separation of the acetaldehyde according to our invention, it is enriched in the catalyst and shortens the useful life of the catalyst.

The formation of the cyanohydrin from acetaldehyde and hydrogen cyanide can be effected by means of an alkaline catalyst, for instance sodium cyanide or sodium hydroxide. The required amount of sodium hydroxide or sodium cyanide is, at a continuously maintained pH of about 9, less than 1 mole percent, calculated on the obtained acrylonitrile.

When acid containing catalysts, for example hydrochloric acid and cuprous chloride containing catalysts, are employed for the main reaction, the required amount of alkali corresponds to the acid distilled off from the acid catalyst.

At a flow of 250 liter gas per 1 liter catalyst per hour, the washed circulated waste gas is substantially free of acetaldehyde; in addition to free hydrogen cyanide, it contains still small amounts of acrylonitrile, which can be recycled through the reactor without any harm.

The acrylonitrile contained in the recycled gas leaving the reactor is preferably washed out by the aqueous alkaline emulsion of acrylonitrile and lactonitrile formed in the conversion of acetaldehyde to lactonitrile.

The temperature, at which the acrylonitrile is recovered simultaneously with the conversion of the acetaldehyde to lactonitrile, is preferably maintained between —10 and +20° C. and it is of advantage to adjust it to a temperature not exceeding 0° C. It is further of advantage to acidify the acrylonitrile and lactonitrile containing overflow obtained in the washing process to a pH of 2 to 4, in order to avoid resin formation and saponification. In this way, we obtain a condensate consisting of two liquid phases and containing about 20 to 30 percent of acrylonitrile, which can be worked up to a relatively pure product.

If, during washing and cyanohydrin formation, the liquid is thoroughly mixed, the two above-mentioned liquid phases form an emulsion. Said two liquid phases or the aqueous alkaline emulsion formed therefrom, respectively, can be stabilized, as already mentioned, by acidulation to a pH of 2 to 4. By a subsequent simple distillation, the acrylonitrile may be separated from the stabilized acetaldehyde-cyanohydrin solution. The crude acrylonitrile, which is evaporated by the distillation and has already a high degree of purity, may be further purified by rectification. The lactonitrile solution may be acidulated, for instance with acetic acid, and buffered to a pH of about 4 to 5, at which pH it can be worked up to hydrogen cyanide by thermal splitting and fractionated distillation without resinification of the acetaldehyde, as would take place at a pH of above 7, said hydrogen cyanide can be recycled into the reaction zone. The acetaldehyde obtained hereby can be used in any desired manner.

The invention presents the advantage that, on the one hand, the acetaldehyde contained in the reaction products is continuously bound by the unconsumed hydrogen cyanide and removed, and that, on the other hand, the process, when carried out with a well determined optimum hydrogen cyanide concentration, avoids almost entirely the formation of monovinyl acetylene and suppresses completely the particularly obnoxious formation of divinyl acetylene.

We have found that for an optimum concentration the hydrogen cyanide content of the gases must be so adjusted that a small excess of about 5 to 25 g., preferably about 10 to 15 g. of hydrogen cyanide per cu. m. must be left in the circulating gas after the reaction products have been removed or after the cyanohydrin has been formed, respectively; said excess is continuously returned with the circulating gases into the reaction zone.

After the washing step, the excess of hydrogen cyanide and the uncondensed acrylonitrile are kept recycling with the acetylene cycle into the reaction zone. Unexpectedly, the acrylonitrile is not affected by the catalyst solution. Neither is the yield decreased, nor can a harmful effect on the catalyst, for instance a shortening of its life, be observed. It is therefore possible to carry out the process in such a way that at least 200 to 250 liters of circulating gas per hour per liter of catalyst are passed through the catalyst solution, which ensures very high outputs. The upper limit is about 350 liters.

The invention will now be described in more detail in the following examples with reference to the accompanying drawing which illustrates by way of example diagrammatically an apparatus suitable for carrying out the process.

The apparatus comprises essentially a reactor R, a separator A providing the absorption zone, a distillation column D, a splitting column S, and a fractionating column F.

As catalyst, we use cuprous chloride in a solution which may contain additional ingredients. In order to dissolve the cuprous chloride, which is the catalyst proper, other chlorides are generally required. The acid concentration is also of influence. We prefer to use hydrochloric acid solutions of cuprous chloride with addition of chlorides such as NaCl, KCl, $NH_4Cl$.

Example 1

The reactor R is filled with 350 ml. of a catalyst solution, which contains 272 g. of cuprous chloride, 118 g. of ammonium chloride, 7 g. of 25% hydrochloric acid, dissolved in water. Said catalyst solution is heated in a nitrogen atmosphere to 80° C. Nitrogen in an amount of about 60 to 90 l./h. is circulated by means of a blower P, through the reactor R, and at the same time hydrogen cyanide is introduced through line 2, until about 15 g. of hydrogen cyanide per ml. are contained in the circulating gas behind the reactor R. Then the nitrogen is slowly replaced by acetylene gas introduced into the reactor R at 1. By addition of fresh hydrogen cyanide at 2, the hydrogen cyanide content in the effluent of the reactor (designated by the numeral 12) is maintained constant at about 10 to 15 g./c. m. The formed acrylonitrile, which is generated in an amount of about 240 g./h., is passed through the separator A countercurrently to an aqueous emulsion of about 20 to 35% acrylonitrile. Hereby, the temperature is kept constant at about 0° C. by means of the circulating pump $P_2$ and the cooler K. The pH of the circulating solution is adjusted to about 8 to 10 by addition of a sodium cyanide or sodium hydroxide solution at 3. After leaving the separator A, the washed circulating gas still contains about 40 to 50 g./cu. m. of acrylonitrile and about 7 to 10 g./cu. m. of hydrogen cyanide; it is substantially free of acetaldehyde. A portion of the circulating emulsion is withdrawn at 4, stabilized with hydrochloric aicd to Congo acidity at 5, and then introduced into the distillation column D, in which it is divided into crude acrylonitrile and an aqueous acetaldehyde-cyanohydrin solution. Said crude acrylonitrile is withdrawn at 6, the aqueous acetaldehyde cyanohydrin solution at 7. The crude acrylonitrile, which contains 91 percent of acrylonitrile, 1 percent of hydrogen cyanide, 0.1 percent of acetaldehyde, and water is fractionated (in a column not shown) to pure acrylonitrile which is free of hydrogen cyanide, acetaldehyde, and divinyl acetylene. The hydrogen cyanide obtained in the first run of the fractionation can be returned into the process (for instance at 10), after removal of any monovinyl acetylene present. The aqueous acetaldehyde-cyanohydrin solution, which leaves the column at 7, is buffered at 8 with sodium acetate solution and acetic acid to a content of about 1 percent of free acetic acid. The thus obtained solution is introduced, by means of the pump $P_3$ into the splitting column S, and the sump temperature of said column is maintained at about 140° C. by applying suitable pressure. The aqueous sodium acetate-sodium chloride solution leaving the splitting column S at 9, is discarded. The anhydrous mixture of acetaldehyde and hydrogen cyanide, which comes off at the top of the splitting column, is passed into the fractionating column F and split therein at normal or elevated pressure. The hydrogen cyanide leaves the fractionating column F at 10 and is recycled to the reactor R, which it enters at 2. The low boiling acetaldehyde leaves the fractionating column F at 11. In this way, at least 90 percent of the hydrocyanic acid and 82 percent of the acetaldehyde, calculated on the split acetaldehyde-cyanohydrin, are recovered.

92 to 96 percent of the introduced hydrogen cyanide is converted to acrylonitrile. About 82 percent of the consumed acetylene is converted to acrylonitrile, and about 7.5 percent to acetaldehyde; this means that about 90 percent of the acetylene is utilized. By avoiding loss of gases, the recited figures may still be increased.

Example 2

680 g.=350 ml. of the catalyst are placed in the reactor R. The catalyst consists of 318 g. of CuCl, 192 g. of KCl, 7 g. of HCl(25%), and 163 g. of water. As the preceding example, the copper content is 30%. The catalyst is heated at 80° C. and the process is carried out as set forth in Example 1. The average daily output was 700 g. of acrylonitrile per liter of catalyst. The yield was 85.8% on consumed acetylene, and 91.3% on consumed hydrogen cyanide. The KCl-containing catalyst used for the example had a longer life than similar catalyst compositions containing ammonium chloride, as used in Example 1.

The foregoing examples are given to illustrate the invention, but it is to be understood that the invention is not to be limited thereby but is to be construed broadly and limited solely by the scope of the appended claims.

We claim:

1. A process of producing acrylonitrile substantially free of divinylacetylene comprising passing acetylene and hydrogen cyanide in an amount exceeding the amount required for the conversion of said acetylene to acrylonitrile though a reaction zone containing aqueous cuprous chloride, reacting said acetylene and hydrogen cyanide in said reaction zone to form acrylonitrile, passing the gas containing said acrylonitrile, the excess of hydrogen cyanide, and acetaldehyde formed as by-product in said reaction zone, into a absorption zone, reacting said acetaldehyde and said excess of hydrogen cyanide in said absorption zone in the presence of an alkaline catalyst at a temperature between −10 and +20° C. to form lactonitrile, forming a mixture of acrylonitrile and lactonitrile in said absorption zone, removing said mixture of acrylonitrile and lactonitrile together form said absorption zone, recycling the residual gases into the reaction zone, and separating said mixture into acrylonitrile and lactonitrile.

2. The process of claim 1, wherein said excess of hydrogen cyanide is so adjusted that said recycled residual gases contain about 5 to 25 g. of hydrogen cyanide per cu. m. of the gases.

3. The process of claim 1, wherein the acrylonitrile and lactonitrile are removed from said absorption zone in form of an aqueous alkaline emulsion and said emulsion is recycled into said absorption zone to absorb the acrylonitrile.

4. The process of claim 1, comprising withdrawing acrylonitrile and lactonitrile from said absorption zone in form of an aqueous emulsion, stabilizing said emulsion with acid, and separating it by distillation into crude acrylonitrile and an aqueous lactonitrile solution.

5. The process of claim 4 comprising acidifying said aqueous lactonitrile solution with acetic acid, and subjecting it to fractionated distillation, thereby obtaining on the one hand hydrogen cyanide and acetaldehyde, and on the other hand an aqueous salt solution.

6. The process of claim 5, wherein the hydrogen cyanide obtained from said lactonitrile is recycled into the reaction zone.

7. The process of claim 1, wherein at least 200 to 250 liters of gas are recycled per liter of catalyst per hour.

8. A process of producing acrylonitrile substantially free of acetaldehyde and divinyl acetylene comprising passing acetylene and an excess of hydrogen cyanide through a reaction zone containing an aqueous solution containing cuprous chloride as catalyst, reacting said acetylene and hydrogen cyanide in said reaction zone to form acrylonitrile, whereby acetaldehyde is formed as a by-product, passing the gases containing said acrylonitrile and acetaldehyde into an absorption zone, maintaining said absorption zone at a temperature not exceeding about 0° C., reacting said acetaldehyde and said excess of hydrogen cyanide in the presence of an alkaline catalyst selected from the group consisting of sodium cyanide and sodium hydroxide to form lactonitrile, removing said acrylonitrile and said lactonitrile in form of an aqueous alkaline emulsion from said absorption zone, recycling part of said emulsion into said absorption zone and passing it therethrough countercurrently to said gases to absorb the acrylonitrile contained therein, acidifying the remainder of said emulsion with acetic acid, subjecting said acidified emulsion to fractionated distillation to split said lactonitrile into acetaldehyde and hydrogen cyanide, and recycling said hydrogen cyanide and the gases leaving said absorption zone into said reaction zone, said excess of hydrogen cyanide passed into the reaction zone being so adjusted that one cubic meter of the gases leaving the absorption zone contains about 10 to 15 g. of hydrogen cyanide.

References Cited in the file of this patent

UNITED STATES PATENTS

| | | |
|---|---|---|
| 2,621,204 | MacLean et al. | Dec. 9, 1952 |
| 2,649,472 | Lovett | Aug. 18, 1953 |
| 2,688,034 | Stehman | Aug. 31, 1954 |
| 2,719,169 | De Croes et al. | Sept. 27, 1955 |

FOREIGN PATENTS

| | | |
|---|---|---|
| 518,687 | Belgium | Apr. 15, 1953 |